United States Patent [19]

Allen

[11] 4,156,462
[45] May 29, 1979

[54] HYDROCARBON RECOVERY PROCESS
[75] Inventor: Joseph C. Allen, Bellaire, Tex.
[73] Assignee: Texaco Inc., White Plains, N.Y.
[21] Appl. No.: 871,897
[22] Filed: Jan. 23, 1978
[51] Int. Cl.² .................. E21B 43/22; E21B 43/24
[52] U.S. Cl. ........................... 166/270; 166/272; 166/273; 252/8.55 D
[58] Field of Search ............ 166/270, 272, 273, 274, 166/275, 303; 252/8.55 D

[56] References Cited
U.S. PATENT DOCUMENTS

| | | | |
|---|---|---|---|
| 2,173,556 | 9/1939 | Hixon | 166/272 |
| 2,584,606 | 2/1952 | Merriam et al. | 166/272 |
| 2,734,578 | 2/1956 | Walter | 166/272 |
| 3,457,996 | 7/1969 | Parker | 166/303 X |
| 3,554,286 | 1/1971 | Feuerbacher et al. | 166/272 X |
| 3,731,741 | 5/1973 | Palmer et al. | 166/272 |
| 3,766,982 | 10/1973 | Justheim | 166/272 X |
| 4,043,922 | 8/1977 | Palmer et al. | 166/272 X |
| 4,048,078 | 9/1977 | Allen | 166/272 X |
| 4,071,458 | 1/1978 | Allen | 166/272 X |

Primary Examiner—Stephen J. Novosad
Assistant Examiner—George A. Suchfield

Attorney, Agent, or Firm—Carl G. Ries; Thomas H. Whaley; Walter D. Hunter

[57] ABSTRACT

A two-step process for recovering hydrocarbons from a subterranean formation in which the formation is first heated by injecting steam at a temperature of about 500° to about 1500° F. through an injection well and in a second step a mixture of carbon monoxide and hydrogen is pressured into the formation via the injection well where in the heated formation reaction with the carbon monoxide and steam takes place forming additional hydrogen and carbon dioxide and finally hydrocarbons are recovered via a production well. Optionally, after injection of the mixture of carbon monoxide and hydrogen into the formation has been terminated, the heat stored in the formation may be recovered by injecting water, as a drive fluid into the formation via the injection well. The injected water may contain a small amount of a sulfated interfacial tension reducer such as a compound of the formula:

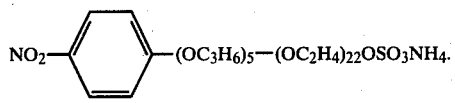

3 Claims, No Drawings

HYDROCARBON RECOVERY PROCESS

BACKGROUND OF THE INVENTION

1. Field of the Invention

This invention relates to a process for recovering hydrocarbons from a subterranean hydrocarbon-bearing formation. More particularly, this invention relates to a method of recovering hydrocarbons in which in the first step the formation is heated by injection of steam via an injection well and in a second step a mixture of carbon monoxide and hydrogen is pressured into the formation via the injection well and hydrocarbons are recovered from the formation via a production well.

2. Prior Art and Background

In recovery of petroleum from subterranean reservoirs, it usually is possible to recover only a minor portion of the petroleum in place by the so-called primary recovery techniques, that is, those techniques which utilize only the natural forces present in the reservoir. Thus, a variety of supplemental recovery techniques have been developed in order to increase the recovery of petroleum in such reservoirs. In these supplemental techniques which are commonly referred to as secondary recovery operations, although they may be tertiary in sequence of employment, energy is supplied to the reservoir as a means of moving the fluid within the reservoir to suitable production wells through which they may be withdrawn to the surface of the earth.

One of the newer developments in secondary recovery methods for petroleum and especially heavy crudes is the use of steam injection which has been applied in several modifications, including the "push-pull" technique and throughput methods and has resulted in significant recoveries in some areas of heavy crude reservoirs. Crude recovery by this process is enhanced through the beneficial effects of the drastic viscosity reduction characteristic of heavy crudes. This reduction in viscosity facilitates the production of hydrocarbons since it improves their mobility, i.e., increases they ability to flow.

SUMMARY OF THE INVENTION

This invention provides an improved process for recovering hydrocarbons from an underground formation penetrated by an injection well and a production well which comprises:

(a) injecting steam via an injection well into the formation thereby heating the formation to an elevated temperature;

(b) terminating the injection of steam;

(c) injecting a mixture of carbon monoxide and hydrogen via the injection well into the formation where reaction of steam injected into the formation in step (a) with the injected carbon monoxide forms additional hydrogen and carbon dioxide; and (d) recovering the displaced hydrocarbons via the said production well.

DETAILED DESCRIPTION OF THE INVENTION

The present invention may be carried out utilizing any suitable injection and production system. The injection and production systems may comprise one or more wells extending from the surface of the earth into the subterranean reservoir. Such injection and production wells may be located and spaced from one another in any desired pattern. For example, a line drive pattern may be utilized in which a plurality of injection wells and a plurality of production wells are arranged in rows which are spaced horizontally from one another. Exemplary of other patterns which may be used are the so-called circular drive patterns in which the injection system comprises a plurality of production wells spaced about the injection well. Typical circular drive patterns are the inverted five spot, seven spot, and nine spot patterns. The above and other patterns are well known to those skilled in the art and for a more detailed description of such patterns reference is made to Uren, L.C., Petroleum Production Engineering-Oil Field Exploitation, Second Edition, McGraw, Hill Book Company Incorporated, New York and London, 1939. While the well patterns described in Uren are with reference to water flooding operations, it will be recognized that such patterns are also applicable to the procedure described herein.

In the steam injection step of the process of this invention saturated steam, wet steam or superheated steam having a temperature of about 500° to about 1500° F. may be utilized. As this first steam heating operation proceeds, the heat from the operation lowers the viscosity of the inplace hydrocarbons which are moved toward the production wells where they are produced.

The steam injection step is generally conducted for a period of about 25 to about 140 days or more and after the formation has been heated for some distance away from the well bore, i.e., from 10 to about 100 ft. or more, injection of steam is terminated. The temperature of the heated portion of the formation at the conclusion of the steam injection step is preferably about 300° to about 1200° F.

In the next step of the process of this invention a mixture of hydrogen and carbon monoxide, for example, as obtained from a synthesis gas generator is injected into the formation via the injection well. If a hydrogen-carbon monoxide mixture obtained from a synthesis gas generator is employed, the ratio of hydrogen to carbon monoxide by volume will depend on the type of fuel employed as feed for the generator. During the step in which the hydrogen-carbon monoxide mixture is injected, additional hydrogen and carbon dioxide are formed by reaction between the carbon monoxide and steam injected into the formation during the initial heating step. The advantages of carbon dioxide in recovering oil from hydrocarbon bearing formations are well known and its use as a displacement medium has been demonstrated. Carbon dioxide having a high solubility in oil causes the oil to swell and substantially reduces the oil viscosity. If desired, saturated steam, wet steam or superheated steam in an amount of from about 5 to 50 percent by volume based on the volume of the carbon monoxide-hydrogen mixture may be introduced into the formation along with the carbon monoxide-hydrogen mixture. The step of heating the formation by injection of steam and the step in which a mixture of hydrogen and carbon monoxide is injected into the formation may be repeated in a cyclic manner, as desired, in operating the process of this invention.

In a preferred method of operating the initial steam heating step of the process of this invention, steam is injected at a temperature of about 800° to about 1200° F. for a period of about 30 to 70 days or more followed by injection via the injection well of a mixture of carbon monoxide and hydrogen for a period of about 20 to about 60 days or more.

In another embodiment of this invention the heat stored in the formation at the end of the reaction period during which the carbon monoxide injected into the formation in the hydrogen-carbon monoxide mixture reacts with the steam in the formation may be recovered by injecting water as a drive fluid into the heated formation via the injection well. The water injected into the hot formation in this step is in turn partially converted into additional steam which displaces more of the in-place oil through the formation and results in the recovery of additional oil via the production well.

If desired, the water injected via the injection well may contain from about 0.001 to about 1.0 weight percent or more of an interfacial tension reducer in order to increase the oil recovery. Alkaline fluids may also be injected via the injection well and in the process of this invention. The drive water is made alkaline, if desired, by the addition of sodium hydroxide or potassium hydroxide to the water in an amount sufficient to give a concentration of about 0.01 to about 0.2 weight percent in the drive water.

Interfacial tension reducers which are highly useful in the process of the invention include sulfated compounds of the formula:

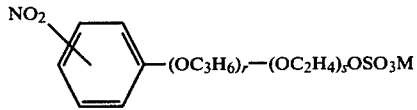
(I)

wherein r is an integer of from 2 to about 5, s is an integer of from 8 to about 60 and M is selected from the group consisting of hydrogen, sodium, potassium and the ammonium ion and compounds of the formula:

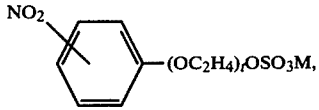
(II)

wherein t is an integer of from 8 to about 40, and M has the same meaning as previously described.

Interfacial tension reducers of this type can be formed by sulfating compounds of the formula:

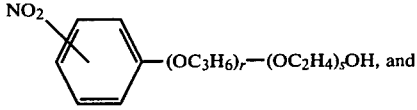
(III)

where r and s have the same meaning as before and compounds of the formula:

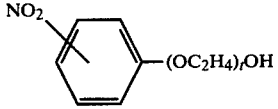
(IV)

where t has the same meaning as before, batchwise with, for example, chlorosulfonic acid in a glass lined kettle at about 30° C. followed by reaction with the corresponding base, if desired.

Starting materials for the sulfated, water-soluble oxyalkylated products of this invention (Type II) can be conveniently prepared by a number of processes well known in the art. For example, ethylene oxide can be reacted with the initiator, such as para nitrophenol, ortho nitrophenol, etc., dissolved in a suitable solvent throughout which an alkaline catalyst, such as potassium hydroxide or sodium hydroxide, is uniformly dispersed. The quantity of the catalyst utilized generally will be from about 0.15 to about 1.0 percent by weight of the reactants. Preferably, the reaction temperature will range from about 80° C. to about 180° C. while the reaction time will be from about 1 to about 20 hours or more depending on the particular reaction conditions employed. This process is more completely described in U.S. Pat. No. 2,425,845.

Starting materials suitable for use in preparing the sulfated oxyalkylated nitrophenol compounds (Type I) useful in the process of this invention include oxyalkylated derivatives containing block polypropylene and polyethylene groups having the formula:

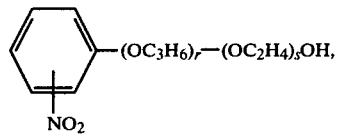

where r is an integer of from 2 to about 5 and s is an integer of from 8 to about 60.

Compounds of the above formula can be prepared by well known methods such as taught, for example, in U.S. Pats. Nos. 3,062,747; 2,174,761; or in 2,425,755. In general, the procedure consists in condensing a nitrophenol with propylene oxide in the presence of an oxyalkylation catalyst until the required amount of the oxide has reacted then continuing the oxyalkylatd reaction with the ethylene oxide until the desired block oxyalkylated polymer is formed.

The present invention will be more fully understood by reference to the following description of one embodiment thereof. A hydrocarbon-bearing formation is penetrated by an injection well which is spaced apart from a production well. The wells are of a suitable type for carrying out steam injection into the formation via the injection well and for recovering hydrocarbons from the formation via the production well. The injection well and the production well each has a casing which extends from the earth's surface down into the lower portions of the formation. The bottom of the casing of each well is sealed by a casing shoe. The injection well is equipped with tubing which extends through the well head downward to a point adjacent the lower extremity of the casing. A packer is positioned on the tubing in the injection well at a point opposite the producing formation and the casing is perforated below the packer and adjacent the tubing end to provide communication with the formation. The production well has a set of perforations through the casing wall opposite the hydrocarbon bearing formation. The initial heating step is begun by injecting steam (90 percent quality) at a temperature of 800° F. into the tubing of the injection well and then into the formation via the casing perforations. Steam injection is continued for about 50 days and at the end of that time the measured temperature of the formation at a point adjacent the casing perforations is about 780° F. In the next step, a mixture of carbon monoxide and hydrogen (about 35 percent carbon monoxide by volume) at a temperature of about 600° F. is injected via the tubing of the injection well and through the casing perforations into the formation over a period of about 75 days during which time the carbon monoxide in the mixture reacts with the steam present in the formation thus forming additional hydrogen and carbon dioxide and during this time hydrocarbons displaced through the formation enter the wellbore of the production well through the casing perforations and are recovered via the production well.

What is claimed is:

1. A process for recovering hydrocarbons from an underground formation penetrated by an injection well and a production well which comprises:
   (a) injecting steam via an injection well into the formation thereby heating the formation to an elevated temperature;
   (b) terminating the injection of steam;
   (c) injecting a mixture of carbon monoxide and hydrogen via the injection well into the formation where reaction of steam injected into thr formation in step (a) with the injected carbon monoxide forms additional hydrogen and carbon dioxide, and
   (d) recovering the displaced hydrocarbons via the said production well and wherein after step (b) there is injected into the formation via the said injection well a drive fluid comprising water containing dissolved therein from about 0.001 to 1.0 weight percent of an interfacial tension reducer selected from the group consisting of a compound of the formula:

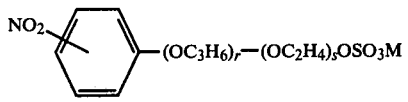

wherein r is an integer of from 2 to about 5, s is an integer of from 8 to about 60 and M is selected from the group consisting of hydrogen, sodium, potassium and the ammonium ion, and a compound of the formula:

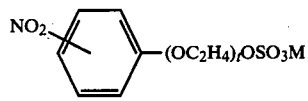

wherein t is an integer of from 8 to about 40 and M has the same meaning as previously described.

2. The process of claim 1 wherein in step (a) superheated steam is injected.

3. The process of claim 1 wherein in step (b) a mixture of carbon monoxide, hydrogen and steam is injected into the formation.